US007117192B2

(12) United States Patent
Waltz et al.

(10) Patent No.: US 7,117,192 B2
(45) Date of Patent: Oct. 3, 2006

(54) TEXT AND IMAGERY SPATIAL CORRELATOR

(75) Inventors: Edward Waltz, Ann Arbor, MI (US); Richard A. Berthiaume, Grand Blanc, MI (US)

(73) Assignee: Veridian ERIM International, Inc., Ann Arbor, MI (US)

( * ) Notice: Subject to any disclaimer, the term of this patent is extended or adjusted under 35 U.S.C. 154(b) by 740 days.

(21) Appl. No.: 09/863,513

(22) Filed: May 23, 2001

(65) Prior Publication Data

US 2002/0178134 A1    Nov. 28, 2002

(51) Int. Cl.
*G06N 5/02*    (2006.01)
*G06F 7/00*    (2006.01)

(52) U.S. Cl. .................. 706/48; 707/3; 707/6; 382/113; 382/155; 382/217; 382/219; 706/45

(58) Field of Classification Search .................. 706/48, 706/45; 717/117; 702/76; 382/219, 217, 382/155, 113; 707/6, 3
See application file for complete search history.

(56) References Cited

U.S. PATENT DOCUMENTS

| | | | | |
|---|---|---|---|---|
| 4,075,604 A | * | 2/1978 | Degasperi | 382/165 |
| 5,222,155 A | * | 6/1993 | Delanoy et al. | 382/215 |
| 5,345,086 A | | 9/1994 | Bertram | 250/558 |
| 5,432,902 A | * | 7/1995 | Matsumoto | 345/812 |
| 5,638,460 A | * | 6/1997 | Nishimori et al. | 382/141 |
| 5,793,888 A | * | 8/1998 | Delanoy | 382/219 |
| 5,848,373 A | | 12/1998 | DeLorme et al. | 701/200 |
| 6,282,540 B1 | * | 8/2001 | Goldensher et al. | 707/6 |
| 6,523,019 B1 | * | 2/2003 | Borthwick | 706/45 |
| 6,741,743 B1 | * | 5/2004 | Stalcup et al. | 382/217 |
| 7,007,010 B1 | * | 2/2006 | Cooper | 707/3 |
| 7,020,326 B1 | * | 3/2006 | Hsu | 382/155 |
| 2002/0156779 A1 | * | 10/2002 | Elliott et al. | 707/6 |

OTHER PUBLICATIONS

"The American Heritage College Dictionary", p. 691, 2002 Houghton Mifflin Company.*
Paper authored by Roby Hyland, Chris Clifton, and Roderick Holland, of the Mitre Corporation Title: GeoNODE: Visualizing News in Geospatial Context (date unknown).
PreView, White Paper 2. "Achieving the Holy Grall: Global-Scale Monitoring and Analysis of Environmental and Societal Indicators," Mar. 15, 1999, Submitted to DCI Environmental Center by ERIM International.

* cited by examiner

*Primary Examiner*—Anthony Knight
*Assistant Examiner*—Sunray Chang
(74) *Attorney, Agent, or Firm*—Gifford, Krass, Groh, Sprinkle, Anderson & Citkowski, PC

(57) ABSTRACT

A text and imagery spatial correlator automatically relates the geographic locations where events referenced in text occur to those same geographic locations appearing in imagery. In the preferred embodiment, the system deploys adaptable, context-sensitive agents for the automatic interpretation of text, and the application of those agents to classify and geolocate textual references. The results are integrated with similar spatial references from imagery in a common data model, accessible by both spatial and non-spatial data correlation. The unique combination of elements enables the system to automatically develop spatial relationships between text and imagery. Although the invention finds utility in numerous applications, the system and method are particularly useful in correlating remote sensor imagery.

21 Claims, 2 Drawing Sheets

TEXT AND IMAGERY SPATIAL CORRELATOR

FIELD OF THE INVENTION

This invention relates generally to database management and search techniques and, in particular, to a system which automatically correlates textual references to events or objects at geographic locations with the corresponding imagery of such objects or events, through contextual inferences.

BACKGROUND OF THE INVENTION

Associations between text and imagery are currently performed almost exclusively using manual methods. With text primarily in the hard copy, as opposed to electronic form, humans are generally required to read, understand and associate text with images in practically all cases.

The commercial knowledge management industry and the national intelligence community have focused on the research and development of tools to correlate and combine qualitative text data using words, phrases and concepts as the basis to search, correlate, combine and abstract from the corpus of electronic texts. Information operations, especially in the symbolic and cognitive domains, require the ability to combine and model structured and unstructured text data across multiple languages.

The DARPA Dynamic Multiuser Information Fusion (DMIF) program developed message parsing capabilities to convert and extract quantitative data sets (target vectors) from structured tactical report formats. The U.S. DoD Joint Directors of Laboratories (JDL) Data Fusion Subpanel has developed a three-level model which characterizes the capabilities of data fusion technologies. Commercial tools developed by Excalibur and Autonomy are pioneering the manipulation of unstructured text, audio and video data to perform fusion functions that approach those defined in the JDL fusion model, including level 1 fusion of words, topics and concepts.

Data fusion developers must consider approaches to perform fusion of both qualitative and quantitative data to develop understandings of situations in which both categories of data are available. Combined fusion processes (FIG. 1) will allow sense data (quantitative) and source data (most often qualitative) to be combined to provide a complete understanding of complex problems.

Knowledgeable subject area analysts currently tackle such problems, but the increasing deluge of global qualitative and quantitative data makes it difficult for those analysts to consider and assess all available data. Combined qualitative-quantitative data fusion and mining technologies will allow all available data to be related and analyzed to bring to the human analysts the most relevant 3-domain model implications, and to allow the analysts to drill-down to the most significant supporting data.

In the current environment, however, with on-line news services and mega-information services available via the Internet, people are unable to keep up with the large volume of unstructured electronic information becoming available. Manual methods are too slow and involve too many interactions in a time of scarce human resources.

One proposed solution to this problem uses metadata; namely key words and computed indices used to label each image as a whole. While such techniques can be used to locate images for some applications, metadata associations still require human interaction, and are similarly too slow.

The need remains, therefore, for a system and methodology that automatically correlates textual references to geographic locations including imagery representative of such locations, preferably through contextual inferences as opposed to key word searching.

SUMMARY OF THE INVENTION

Broadly, this invention resides in a text and imagery spatial correlator that automatically relates the geographic locations where events referenced in text occur to those same geographic locations appearing in imagery. In the preferred embodiment, the system deploys adaptable, context-sensitive agents for the automatic interpretation of text, and the application of those agents to classify and geolocate textual references. The results are integrated with similar spatial references from imagery in a common data model, accessible by both spatial and non-spatial data correlation. This unique combination of elements enables the system to automatically develop spatial relationships between text and imagery. Although the invention finds utility in numerous applications, the system and method are particularly useful in correlating remote sensor imagery.

DETAILED DESCRIPTION OF THE INVENTION

The text and imagery spatial correlation (TISC) technology disclosed and described herein provides the ability to automatically locate a geographic site at which an event referenced in a text report occurs. The invention automates the entire text-to-imagery spatial correlation process. In contrast to existing methodologies, the implementation of this capability relies on the existence of a text parsing and interpretation engine which uses context rather than key words for searching.

The invention also uses a user-trainable agent to define the context of interest in the current search. Although the following description makes reference to imagery in the form of geospatial data derived through remote sensing, it should be kept in mind that the invention is useful in a much broader range of applications and, indeed, any situation which would benefit from a text to imagery correlation, particularly when based upon a contextual as opposed to key word search.

The TISC has four important characteristics:

1. A user-defined database of current knowledge dynamically determines the features upon which the TISC will base its correlation of an input article. This knowledge base is used to define an agent supporting the assessment of the article;

2. A sequentially accessed combination of user data which allows the level of fidelity of the search and identification to be continually improved to the required level, or to the level supported by the article, whichever happens first;

3. A knowledge base for evaluating an article which can be re-trained to use additional data as defined by the user. Thus, the performance of the TISC can be enhanced with use; and 4. In the preferred embodiment, an a priori glossary of terms (for example, a Gazeteer of geographical names) is used to convert geo-identifications into specific lat-long locations.

Figure 2:
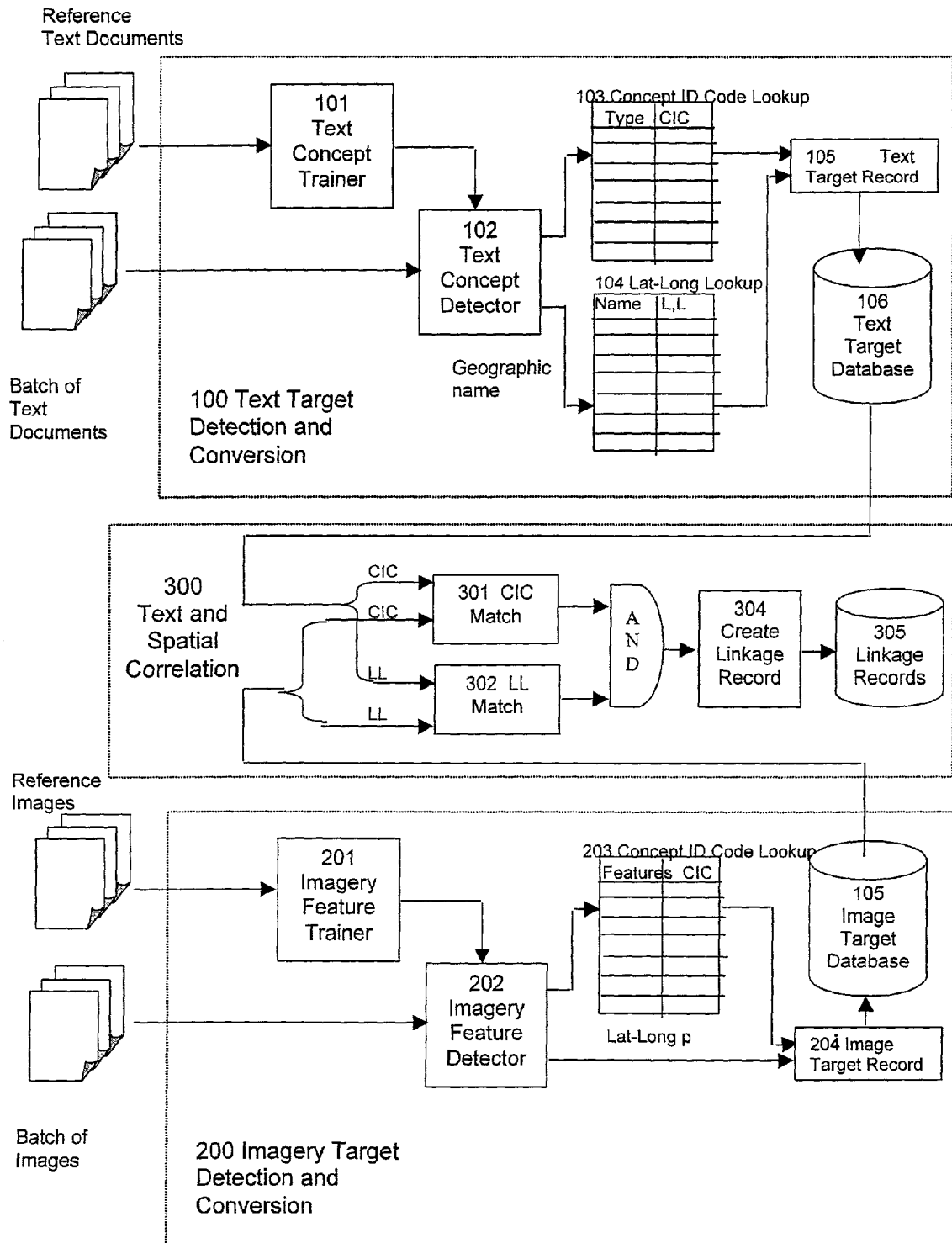
FIG. 2 is a block diagram of a text and imagery spatial correlator (TISC) according to the present invention.

FIG. 2 is a block diagram of a text and imagery spatial correlator (TISC) according to the invention. The TISC provides automated, context-based association between objects or events in text and imagery in a retrainable environment. The TISC automatically detects and correlates events (e.g., forest fires, traffic jams, building fires, floods) or objects (e.g., forests, vehicles, buildings, rivers) that are observable in imagery and described in text reports. The TISC detects events or objects (either in imagery or text reports) and creates a common descriptor such that the correlator can associate the events or objects, independent of the source of the data and type of detection.

Figure 1:
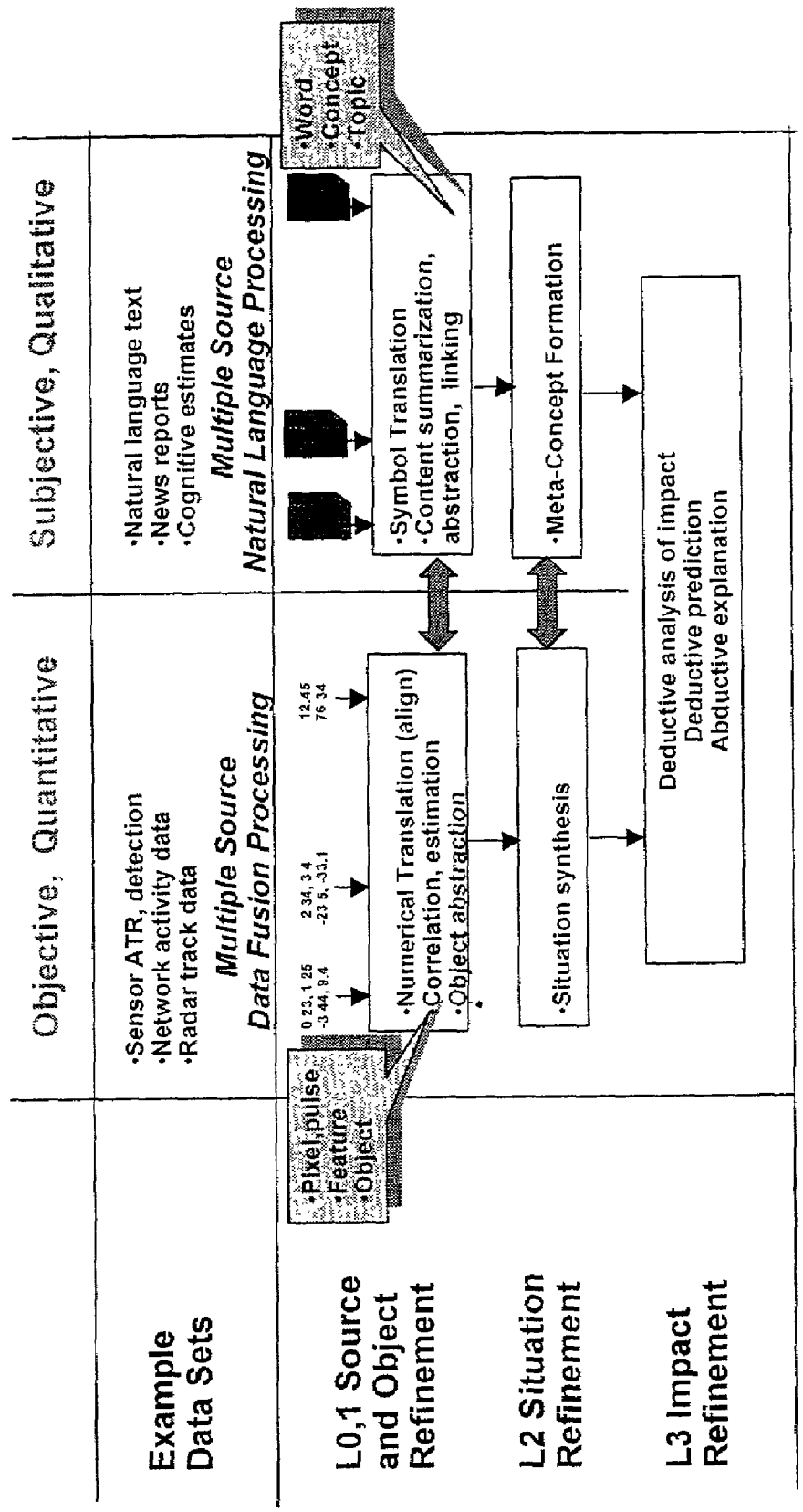
FIG. 1 depicts combined fusion processes which allow sense data and source data to be combined according to the invention to provide a complete understanding of complex problems.

The TISC is comprised of a text detector and converter (100), an imagery detector and converter (200), and a common correlator (300) that associates events and objects, independent of source. Although the operation of the TISC is described in a batch mode, the general operating principle can be extended to operate in a recursive flow. In the batch operation, a large set (batch) of text documents is processed (100) to detect events/objects and place them in a data base; concurrently, a separate batch of images is processed (200) to detect event/objects and place them in a database. The two databases are correlated (300) to link all common events/objects that are detected in the two batches. The batch operation of the TISC (FIG. 1) will now be described in the sequence just outlined.

Text Detection and Conversion (100)

The text detection and conversion process described below may be implemented in commercial text search engine. The first step in the process is to train (101) the search detector (102) for a particular "target concept" (object or event), such as a forest fire, using a descriptive phrase (preferably not just "forest fire" but, rather, "uncontrolled burning of native plants, trees and shrubs"). Such a phrase may be extracted from a document that matches the information being sought, or by providing a collection of reference documents for analysis.

The search phrase is defined, tested on the validation set, and refined until the detector (102) detects all relevant targets in the validation set. Once trained, the detector (102) reviews each document in the batch of text documents. Whenever a text region within the document matches the target concept, the target concept is converted to a concept identifier code by lookup table (103).

The text region is searched for geographic location text associated with the target concept (e.g. name of location of the target concept; city, river, island, lake, mountain range, region, etc.). This is preferably accomplished by reference to a Gazeteer of place names and their corresponding Lat-Long locations. There are many such Gazeteers available, including one from the U.S National Imagery and mapping Agency, NIMA.

The location text is compared to a Gazetteer lookup table (104) to match the location text (e.g. city of Goldeza) and lookup the numerical latitude-longitude value. A text target detection record (105) is placed in the text target database (106) that contains: (1) the text document ID number, (2) an index to locate the paragraph within the document, (3) target concept identifier code (CIC), and (4) latitude-longitude (LL) value. At the conclusion of text batch processing, all text containing target concepts within the batch are recorded as target record in the text database (106).

Image Detection and Conversion (200)

The imagery detection and conversion process described below may also be implemented in commercial imagery processing tool. The first step in the process is to train (201) the image feature detector (202) for a particular "target concept" (object or event) using discriminating features within the type of imagery being used (e.g. infrared. multispectral or spatial features). Once trained, the detector (202) reviews each image in the batch of imagery. Whenever a region within an image matches the target feature set, the detection is recorded by creating a concept identifier code for the detected target type, and extracting the lat-long from the location within the imagery (203).

An image target detection record (205) is placed in the text database (204) that contains: (1) the image ID number, (2) an index to locate the target within the image (e.g. pixel index), (3) target concept identifier code (CIC), and (4) latitude-longitude (LL) value. At the conclusion of text batch processing, all images containing target concepts within the batch are recorded as target record in the image target database (206).

Text and Spatial Target Correlation (300)

The preceding processes have converted all detected target concepts to record formats that (1) reference each detected target to the original source document or image, and (2) describe the target concept in a common format by two numerical values: concept identifier code (CIC) and latitude-longitude (LL). The text and spatial target correlator now compares the records in both databases to associate and create linkages between all records that describe a common target event or object. The simplest joint match criteria for declaring an approximate correlation between two records, A and B, are:

IF CIC in record A=CIC in record B (exact match)
AND (LL) in record A is within S of (LL) in record B (neighborhood match)
THEN Record A and Record B are associated
(Where S is a user-selectable spatial distance)

The exact match of CICs is performed by 301, and the neighborhood match of latitude-longitude is performed by 302. The logical AND (303) of these criteria causes a linkage record to be created (305) that defines the common target type and the location of the image record and corresponding text records in the respective databases (105, and 204). The database of linkages (305) provides a means to identify all targets that are both reported in text and observed in imagery.

We claim:

1. A method of correlating text and imagery, comprising the steps of:
    specifying a target concept;
    providing textual material and imagery;
    training a text search detector to examine the textual material for text regions which relate to the target concept, and creating a text target detection record in a database A in the event of a match or other meaningful association;
    training a discriminating feature detector to search for locations within the imagery which relate to the target concept, and creating a location target detection record in a database B in the event of a match or other meaningful association; and
    comparing the records in both databases to declare an approximate correlation, if any, indicative of a common target concept.

2. The method of claim 1, wherein the target concept is an event or object.

3. The method of claim 1, wherein the discriminating features within the imagery include infrared, multispectral or spatial features.

4. The method of claim 1, wherein the step of training the text search detector includes the steps of:
   a) defining a search phrase;
   b) testing the phrase against a validation set, and
   c) repeating a) and b) until all relevant targets in the validation set are detected.

5. The method of claim 1, wherein the examination of the textual material includes searching the text regions for geographic location text associated with the target concept.

6. The method of claim 1, further including the step of generating a concept identifier code in both the text and image target detection records using a lookup table in the event of a match or other meaningful association.

7. The method or claim 6, wherein the searching of the text regions is accomplished by reference to a Gazeteer of place names and their corresponding lat-long locations.

8. The method of claim 7, wherein the text target detection record contains:
   a text document ID number,
   an index to locate a paragraph or passage within the document.
   the target concept identifier code (CIC), and
   the latitude-longitude (LL) value.

9. The method of claim 6, wherein the search for locations within the imagery includes extracting a lat-long location.

10. The method of claim 9, wherein the location target detection record contains:
    an image ID) number,
    an index to locate the target within the image,
    the target concept identifier code (CIC), and
    the latitude-longitude (LL) value.

11. The method of claim 1, wherein the target concept within the imagery is in the form of a pixel index.

12. The method of claim 10, wherein:
    the searching of the rest regions is accomplished by reference to a Gazercer of place names and their corresponding lat-long locations; and
    the text target detection record contains:
    a text document ID number,
    an index to locate a paragraph or passage within the document,
    the target concept identifier code (CIC), and
    the latitude-longitude (LL) value.

13. The method of claim 2, wherein the event may be characterized as an emergency, tragedy, disaster or crisis.

14. The method of claim 2, wherein the object involves an environmental asset, structure, or mode of transportation.

15. The method of claim 1, wherein either or both of the steps associated with examining the textual material or searching for locations within the imagery are carried out in a batch mode or as part of a recursive flow.

16. A text and imagery spatial correlator, comprising:
    a document text parsing and interpretation engine which uses a context-based search to generate topical information;
    an imagery engine operative to associate the components of an image with known spatial features and generate location information; and
    a matching subsystem operative to associate the topical information with the location information and present a result to a user.

17. The text and imagery spatial correlator of claim 16, wherein text parsing and interpretation engine includes a user-trainable agent to define the context of interest in a current search.

18. The text and imagery spatial correlator of claim 16, wherein the topical information concerns an event or an object.

19. The text and imagery spatial correlator of claim 18, wherein the event may be characterized as an emergency, tragedy, disaster or crisis.

20. The text and imagery spatial correlastorof claim 18, whcitin to object involves an environmental asset, structure or mode of transportation.

21. The text and imagery spadal correlator of claim 16, wherein to matching subsystem is operative to associate the topical information with the location information in a batch mode or as part of a recursive flow.

* * * * *

UNITED STATES PATENT AND TRADEMARK OFFICE
CERTIFICATE OF CORRECTION

PATENT NO. : 7,117,192 B2
APPLICATION NO. : 09/863513
DATED : October 3, 2005
INVENTOR(S) : Edward Waltz and Richard A. Berthlaume It is certified that error appears in the above-identified patent and that said Letters Patent is hereby corrected as shown below:

Column 5, line 17: Replace "method or claim" with --method of claim--
Column 5, line 24: Replace "document." with --document,--
Column 5, line 31: Replace "ID) number" with --ID number--
Column 5, line 38: Replace "rest regions" with --test regions--
Column 5, line 39: Replace "Gazercer" with --Gazeteer--
Column 6, line 34: Replace "correlastorof" with --correlator of--
Column 6, line 35: Replace "whcitin to" with --wherein the--
Column 6, line 37: Replace "spadal" with --spatial--
Column 6, line 38: Replace "wherein to" with --wherein the--

Signed and Sealed this

Twenty-seventh Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 7,117,192 B2
APPLICATION NO. : 09/863513
DATED : October 3, 2006
INVENTOR(S) : Edward Waltz and Richard A. Berthlaume It is certified that error appears in the above-identified patent and that said Letters Patent is hereby corrected as shown below:

Column 5, line 17: Replace "method or claim" with --method of claim--
Column 5, line 24: Replace "document." with --document,--
Column 5, line 31: Replace "ID) number" with --ID number--
Column 5, line 38: Replace "rest regions" with --test regions--
Column 5, line 39: Replace "Gazercer" with --Gazeteer--
Column 6, line 34: Replace "correlastorof" with --correlator of--
Column 6, line 35: Replace "whcitin to" with --wherein the--
Column 6, line 37: Replace "spadal" with --spatial--
Column 6, line 38: Replace "wherein to" with --wherein the--

This certificate supersedes Certificate of Correction issued February 27, 2007.

Signed and Sealed this

Twentieth Day of March, 2007

JON W. DUDAS
*Director of the United States Patent and Trademark Office*